United States Patent

Petersen et al.

[11] Patent Number: 5,762,321
[45] Date of Patent: Jun. 9, 1998

[54] METHOD OF INSERTING CABLES INTO TUBING

[75] Inventors: Jørgen Petersen, Virum; Jean Førstø, Herlev, both of Denmark

[73] Assignee: MEAB Mobile Equipment AB, Mölndal, Sweden

[21] Appl. No.: 416,755

[22] PCT Filed: Oct. 18, 1993

[86] PCT No.: PCT/SE93/00850

§ 371 Date: May 17, 1995

§ 102(e) Date: May 17, 1995

[87] PCT Pub. No.: WO94/09538

PCT Pub. Date: Apr. 28, 1994

[30] Foreign Application Priority Data

Oct. 20, 1992 [SE] Sweden ................................. 9203073

[51] Int. Cl.⁶ .................................................. B66F 3/00
[52] U.S. Cl. ............................................... 254/134.4
[58] Field of Search ................. 254/134.3 R, 134.3 FT, 254/134.4

[56] References Cited

U.S. PATENT DOCUMENTS

| | | | |
|---|---|---|---|
| 382,257 | 5/1888 | Geyser | 254/134.4 |
| 1,851,435 | 3/1932 | Jessup | 254/134.4 |
| 2,980,399 | 4/1961 | Littlefield . | |
| 3,006,607 | 10/1961 | Hamrick | 254/134.4 |
| 3,034,766 | 5/1962 | Hamrick | 254/134.4 |
| 4,083,533 | 4/1978 | Schwabe | 254/134.4 |
| 4,185,809 | 1/1980 | Jonnes . | |
| 4,498,659 | 2/1985 | Brockelsby et al. | 254/134.4 |
| 4,676,310 | 6/1987 | Scherbatskoy et al. | 254/134.4 |
| 4,856,937 | 8/1989 | Grocott et al. | 254/134.4 |
| 5,121,644 | 6/1992 | Grey et al. | 254/134.4 |
| 5,143,353 | 9/1992 | Sano et al. | 254/134.4 |
| 5,156,376 | 10/1992 | Spicer | 254/134.4 |
| 5,456,450 | 10/1995 | Reeve et al. | 254/134.4 |

FOREIGN PATENT DOCUMENTS

| | | | |
|---|---|---|---|
| 0 264 767 | 4/1988 | Germany . | |
| 6-121425 | 4/1994 | Japan | 254/134.4 |

Primary Examiner—Robert C. Watson
Attorney, Agent, or Firm—Burns, Doane, Swecker & Mathis, L.L.P.

[57] ABSTRACT

The invention relates to a method of inserting one or more cables into a cable-surrounding tubing (4) with the aid of a liquid (water). The specific gravity of the cable (3a) is adapted to correspond, or at least generally correspond to the specific gravity of the liquid (1a) used. The liquid (1a) present in the tubing and the flow of the liquid therethrough function as a means to support the cable (3a) and its cable section and/or to reduce the weight of the cable 3(a) and its cable section, and also as a means of entraining the cable and its cable section through the tubing (4). Each cable section (3a) to be laid in the tubing is intended to pass through a nozzle (10) or the like prior to entering the tubing through one end thereof. The insertion of one or more cables into the tubing is effected with the aid of a piston unit (20).

3 Claims, 1 Drawing Sheet

METHOD OF INSERTING CABLES INTO TUBING

TECHNICAL FIELD

The present invention relates to a method of inserting one or more cables into tubing that is intended to encase the cable or cables, with the aid of a liquid.

According to the invention, the specific gravity of the cable shall correspond, or essentially correspond, to the specific gravity of the liquid used to the greatest possible extent.

This enables the liquid and the liquid flow through the tube or tubing to function as a means of supporting the cable and the various cable sections in the tube or of reducing the weight of said cable and cable sections, and as a means of entraining the cable and cable sections through the tubing.

Each cable section to be laid within the tube is intended to pass through a nozzle before it passes through one end of the tube and into the tube.

A method of this kind finds particular application when a non-metallic optic fibre cable is to be lain in or drawn through a tube with the aid of water.

The invention also relates to a special piston unit and a nozzle that can be used when practicing the method.

The piston unit and/or the nozzle may also be used when laying cables in tubes in other ways, for instance when using compressed air instead of a liquid medium or water.

BACKGROUND ART

It is known to lay an optical fibre cable in a ground-buried tube, normally a plastic tube, with the aid of flowing water.

In this regard, it has been necessary to allow large volumes of water to pass through the tube at high rates of flow, and therewith create conditions under which the cable can be inserted carefully into the tube, wherein the water flow exerts on the cable within at least an upstream end-part of the tube a pressure which is sufficiently great for the cable to be able to pass through an adapted, short section of the tube.

It is known that optical fibre cables are sensitive to compression and tensile forces, and that there is a risk of damage to one or more of the fibre filaments or threads even when a moderate force is exerted.

DISCLOSURE OF THE PRESENT INVENTION

TECHNICAL PROBLEMS

When laying cables in a tube in accordance with the aforegoing, or when laying cables in tubing or piping with the aid of a liquid, it will be seen when considering the present state of the art that a technical problem resides in the ability to adapt the pressure and/or tensile (pulling) forces that act on the cable within the tube and to readily adapt the pushing force exerted on the cable from outside the tube, so as to greatly reduce the risk of damage to the cable or completely eliminate such risk.

Another technical problem is one of realizing that cables can be laid in tubes with a smaller volume of water than required with earlier known methods and with a filled tube and through long sections of tubing.

A further technical problem with cable drawing or laying operations of the aforesaid kind is one of creating conditions for adaptation between the tensile force acting on the forward end of the cable (the downstream end) and the pushing or pressing force acting along the cable as a result of the liquid-flow, among other things.

A technical problem is also found in realizing the significance of using a specially constructed nozzle which can provide the aforesaid adaptation in a simple manner.

When considering the present state of the art as described above, it will be seen that a technical problem resides in providing a method by means of which one or more cables can be inserted into a tube surrounding said cable or cables with the aid or a liquid and also with the aid of a piston unit which requires a smaller volume of water than the earlier methods and which provides a greater degree of flexibility than said methods.

It will also be seen that a technical problem resides in realizing the significance of inserting mutually sequential cable sections into a tube and of laying the cable in said tube is facilitated when the cable is relatively clean when inserted into the tube, and that this requirement requires a novel approach with regard to the configuration and construction of the nozzle It will also be seen that a technical problem resides in realizing the significance of utilizing a small volume of the available liquid to wash clean the outer surface of the cable section located within the nozzle.

Another technical problem is one of realizing the significance of using a special nozzle through which the cable is allowed to pass, and to construct the nozzle interior so that it is able to accommodate part of the available liquid and to allow said part to flow through the nozzle, this liquid-flow through the nozzle being controlled to wash clean the outer surface of the cable section.

It will also be seen that another technical problem is one of realizing the significance of providing the nozzle with an outer casing and an inner, elastic packing.

Another technical problem is one of realizing the significance of dividing the outer casing of the nozzle and its inner packing into two parts in a plane which passes through the centre line of two channel sections, of which one is intended to correspond or essentially correspond to the cross-section of the cable, so as to enable the cable to be placed easily in the nozzle when said parts are separated and to embrace the cable when said parts are in their assembled state, while the second channel section is larger than the cross-sectional dimension of the cable.

It will also be seen that another technical problem resides in realizing the significance of providing an elastic packing which includes a first channel section adapted to the thickness and cross-section of the cable and a second channel section which lies adjacent said first channel section and which is larger than the cable thickness and cable cross-dimensions.

A further technical problem is one of realizing that effective washing of the cable surfaces can be achieved readily with the aid of an inlet and an outlet which communicate primarily with the second channel section, and therewith of realizing the significance of placing the inlet in one end part of the second channel section and of placing the outlet in the other end of said channel section, so that the cable will be washed along the full extension of the second channel section.

It will also be seen that another technical problem is one of realizing that the outlet, in the form of a third channel section, shall be arranged to pass through the casing and the packing and to communicate with the second channel section for the discharge of used wash water, that can be reused.

Another technical problem is one or realizing the significance of providing a fourth channel section, which shall be used as an inlet which extends between the second channel section and the tube and therewith create conditions such that part of the pressurized liquid within the tube will pass through said channel section.

A further technical problem is one of realizing the significance of allowing the cable to be inserted into the nozzle with the aid of a cable feeder and to subject the cable section located in the tube to a pressure and/or tensile force exerted by the liquid and the liquid-flow, and therewith realize the significance of adapting the cable infeed speed and infeed force through the nozzle in accordance with the available cable exiting force in the tube, so as to prevent damage to the fibre-glass threads or filaments of the optical fibre cable as the cable is drawn through a long tube and tubing.

It will also be seen that a technical problem resides in providing an arrangement which offers greater efficiency and will enable optical fibre cables to be laid in tubing more quickly than hitherto known methods.

A further technical problem is one of realizing the significance of enabling cables to be lain in or drawn through tubing which is considerably longer than 200 metres, which has been found the limit with earlier known mechanical arrangements, and the cost-benefits entailed.

Yet another technical problem is one of realizing that a selected liquid working pressure with respect to the liquid medium used will enable longer cables to be laid; this can be illustrated by the fact that a water pressure of 1 to 2 bars enables optical fibre cables to be inserted into liquid-filled tubes up to 2 to 3 kilometers in length.

When using a piston unit or piston device which is attached to the forward end of the cable, a technical problem resides in dimensioning the associated elastic seals so that at least one of the seals, at working pressure, will allow a smaller flow of liquid to pass and therewith assist in advancing the cable through the tubing.

A further technical problem is one of realizing the significance of dimensioning the elastic seals so that the seals will open to allow more liquid to flow through the tube at a pressure which exceeds the working pressure by 50–100% or more for instance, this liquid-flow then exerting a greater pushing and pulling force on the cable section and reducing the resistance around the piston unit.

With regard to the piston unit or piston device, a technical problem is one of realizing the significance of providing a central body having front and/or back elastic devices and therewith create a condition for effective cable pulling within tubing.

Another technical problem is one of realizing the significance of the configuration and nature of the elastic devices used, in order to achieve a well-adapted tensile force with only small water consumption, even when laying a cable in a curved tube.

Another qualified technical problem resides in quickly establishing the position of the front end of the cable when laying of the cable in the tubing is stopped.

SOLUTION

The present invention is based on a known method of inserting one or more cables into a cable-surrounding tube with the aid of a liquid, such as water, wherein the specific gravity of the cable is adapted to correspond, or at least essentially correspond, to the specific gravity of the liquid used, wherein the liquid present in the tube and the flow of liquid therethrough function to support the cable and its cable section and/or to reduce the weight of the cable and its cable section and to entrain the cable and its cable section through the tube, and wherein the cable section to be inserted into the tube is intended to pass through a nozzle or an opening prior to said cable section passing through the end of the tube and into said tube.

In accordance with the invention, a method of the aforesaid known kind is supplemented by inserting said one or more cables into the tubing with the aid of a special piston unit which is attached to the front end of the cable while using a special nozzle.

The invention thus relates to the use of a nozzle which is particularly suited for use in a method of the aforedescribed kind, wherein part of the liquid available is forced into the interior of the nozzle so as to come into contact with the outer surface of a cable section passing through the nozzle interior, and wherein said liquid is directed to wash clean the outer surface of said cable section prior to moving said cable section into the tubing through the up-stream end thereof.

In accordance with proposed embodiments that fall within the scope of the invention, the nozzle includes an outer casing and an inner elastic packing.

The outer casing and the inner packing of the nozzle are preferably divided into two parts in a plane that passes through the centre of two channel sections, or which one corresponds to, or generally corresponds to the cross-dimensions or the cable.

The elastic packing part will conveniently include a first channel section which is adapted to the thickness of the cable, and a second channel section which is larger than the thickness of the cable.

Cleaning of the outer surface of the cable is effected primarily within the extension of the second channel section, through the medium of an inlet and an outlet.

According to one embodiment of the invention the outlet has the form of a third channel section and passes through the casing and the packing and communicates with the second channel for discharge of the used wash water, which can be reused.

A fourth channel section is provided as an inlet and extends between the second channel section and the tubing, and part of the pressurized liquid within the tubing passes through said channel section.

It is also suggested that the cable is a non-metallic optic fibre cable and that the pressurized liquid is water.

According to another embodiment of the invention, the cable is inserted into the nozzle with the aid of a cable feeder and that the cable section located within the tubing is subjected to a pressure and/or tensile force by the liquid and liquid-flow in said tubing.

The invention also relates to the use of a piston unit or piston device adapted particularly for use with the aforesaid method.

To this end, it is proposed that the piston unit includes a central body having a cross-sectional size which is considerably smaller than the inner cross-sectional size of the tubing and which is provided with front and rear elastic "seals". Each of these seals shall be capable of sealing against the internal surface of a piece of tubing at a normal working pressure of, for instance, up to 2 bars, such that an adapted smaller volume of liquid will pass beyond the seal or seals.

The seal or seals shall also be arranged so that a considerably larger volume of water will pass beyond the seal or seals at an applied overpressure of, e.g., 3–5 bars.

According to one proposed embodiment, respective seals shall widen rearwardly as seen in the feed direction.

It is also proposed that each elastic device is comprised of from two to ten lamellae, preferably three to seven lamellae.

The lamellae, or at least a largest lamella, will have a cross-sectional size which is from 1 to 10% smaller than the internal cross-sectional dimensions of the tubing.

The central body may comprise an active probe which functions to transmit radio signals or the like.

ADVANTAGES

The advantages primarily afforded by an inventive method, inventive nozzle and inventive piston device reside in the creation of conditions which enable a cable to be laid in cable-surrounding tubing with the aid of a liquid and through much longer distances than is possible with earlier known methods while using much less liquid, such as much less liquid than that required by such methods. The invention also greatly reduces, if not totally eliminates the risk of damage to the fiberglass threads or filaments in the optical fibre cable awhile laying the cable in the tubing.

BRIEF DESCRIPTION OF THE DRAWINGS

An exemplifying embodiment of a method and associated devices at present preferred and possessing features significant of the present invention will now be described in more detail with reference to the accompanying drawings, in which.

DESCRIPTION OF EMBODIMENTS AT PRESENT PREFERRED

Figure 1:
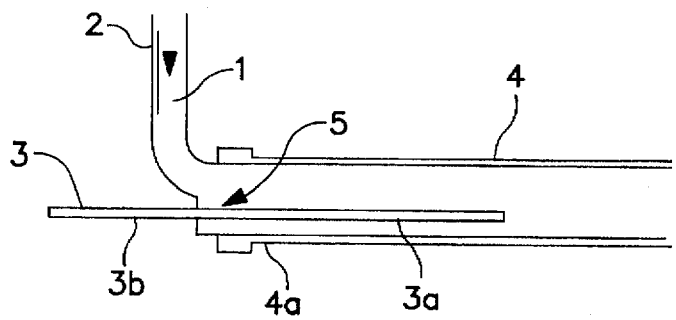
FIG. 1 illustrates in side view and in section an earlier known method of inserting an optical fibre cable into tubing with the aid of, flowing water.

FIG. 1 is a side view of an earlier known arrangement by means of which one or more cables 3 can be inserted into a buried plastic tubing 4 with the aid of liquid which passes through a pipe 2 in the form of a liquid-flow 1.

The specific gravity of the cable 3 will to the greatest possible extent correspond, or generally correspond, to the specific gravity of the liquid used. When the cable 3 is a fibreoptic cable, the specific gravity of the cable will be about 15–20% higher than the specific gravity of the water used, implying a significant reduction in weight and simpler cable laying.

Thus, the presence of water in the tubing 4 and the flow of water therethrough shall function to support the cable and its cable section 3a located within the tubing 4 and to reduce the weight of said cable and said cable section, and also as a means of entraining the cable and its cable section 3a through said tubing, wherein each cable section 3b to be inserted into or laid within the tubing 4 is intended to pass through a nozzle 5 located upstream of the tubing prior to said cable section passing into said tubing through the upstream tubing end 4a.

Figure 2B:
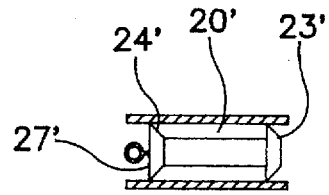
FIG. 2 is a sectional side view of an inventive arrangement comprising a special nozzle and a piston unit which can be moved within the tubing and which includes seals which enable the tubing to be filled with liquid, such as water.
Figure 2C:
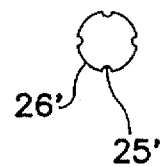
Figure 2A:
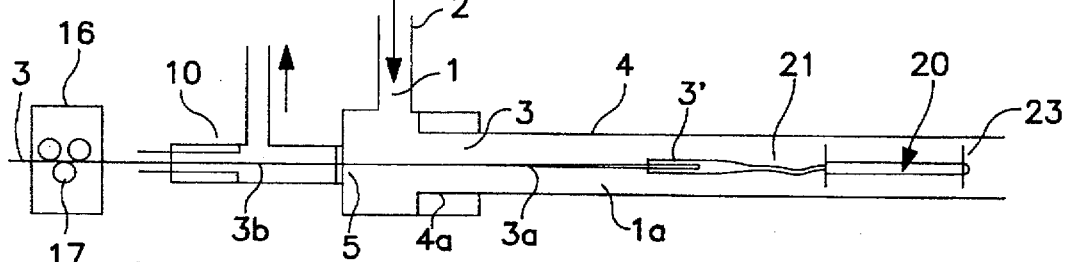

FIG. 2 is a side view which illustrates, in principle, an arrangement according to FIG. 1 that has been supplemented with an inventive nozzle and an inventive piston unit or piston device.

Those parts of the FIG. 1 illustration which find correspondence in the FIG. 2 illustration have been identified by the same reference signs.

According to the invention, the nozzle 10 is configured so that a part of the liquid available will be forced into the interior of the nozzle and there come into contact with the outer surface of the cable section passing through the nozzle interior, this part liquid-flow being intended to wash clean the outer surface or surfaces of said cable section prior to the cable section being pushed into the tubing 4, through the end 4a of said tubing.

The part-flow of available liquid can be forced into the nozzle 10 with the aid of a separate circuit not shown in the Figure, or part of the liquid-flow 1 can be diverted to the nozzle 10, as described in more detail herebelow.

This part of the liquid-flow can be passed conveniently back to a tank or some like vessel, for reuse.

Figure 4A:
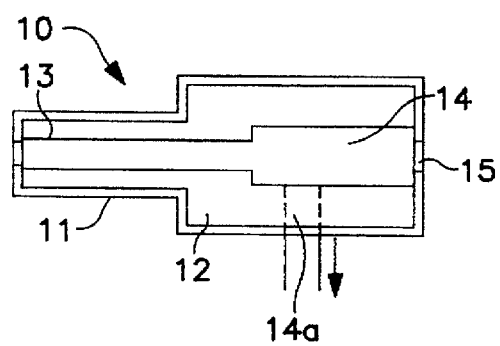
FIG. 4 is a sectional view of an inventive nozzle.
Figure 4B:
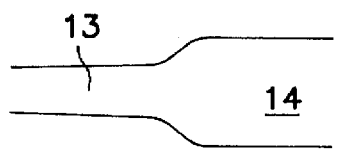

As will be seen particularly from FIG. 4, the nozzle 10 has a metal outer casing 11 and an inner elastic packing part 12.

The outer casing of the nozzle and its inner packing are divided into two equal parts. As shown in the horizontal view of FIG. 4, one of these parts is divided in a plane which passes centrally through two channel sections 13, 14, of which one channel section 13 corresponds, or generally corresponds to the cross-sectional dimension of the cable, where two such channel sections, one for each part, mutually coact. The channel cross-sections are normally circular in the present case.

Thus, the elastic packings 12 have a first channel cross-section 13 which is adapted to the thickness and shape of the cable and a second channel cross-section 14 which is larger than the thickness of the cable, this latter channel cross-section having a diameter which is roughly twice the cross-sectional dimension of the cable.

The cable surface of surfaces is/are washed primarily within the extension of the second channel section 14 through the medium of an inlet and outlet.

The outlet 14a has the form of a third channel section which extends through the casing 11 and the packing 12 and communicates with the second channel section 14 for discharge of the used washing or rinsing water.

The inlet has the form of a fourth channel section 15 which extends between the second channel section 14 and the tubing 4 and through which part of pressurized water within the tubing 4 passes.

As FIG. 2 is intended to show, the cable 3 is inserted into the nozzle 10 with the aid of a cable feeder 16 provided with driven wheels 17, and the channel section 3a located within the tubing will be subjected to a pressure or tensile force by the flow of liquid therethrough.

It will be obvious that the speed and the force at which the channel section 3b is fed-in must be adapted to the pulling force acting on the channel section 3a, so as not to damage the fibre optic conductors, and with the aid of a piston device 20 and a so-called stocking 21, the front end 3' of the cable can be attached to the cable device which generates a pulling force in the cable section 3a within the tubing 4 over and above the force exerted by the flow of liquid.

The piston device 20 includes a front 23 and a rear 24 elastic device or "seals".

At least one or these sealing devices, for instance the front device 23, is intended to allow a small volume of liquid to pass beyond the seals when the liquid collection 1a in the tubing 4 is under normal working pressure, this liquid collection being assumed to fill the tubing upstream of the piston unit and having a working pressure of 1–2 bars. This volume of water can be assumed to provide the following force distribution to a long cable in the tubing.

Within the first third of the inserted cable, it can be assumed that the cable is pressed into the tubing by the cable feeder 17 and there subjected to a pressure force. Within the intermediate third, the cable section is "buoyant" in the liquid and accompanies the flow of liquid with a subsequent reduction in weight, while within the last third the cable section is subjected to a tensile force exerted by the piston unit 20.

When insertion of the cable is restarted or stopped, the pressure can be increased up to 4–5 bars, which results in a greater volume of liquid passing beyond the "seal" and therewith increasing at least the section of "buoyant" cable towards the piston unit, which can commence cable laying with a smaller force.

The invention thus provides three different possibilities of adjusting the force to which respective cable sections are subjected during a cable laying operation.

Figure 3:
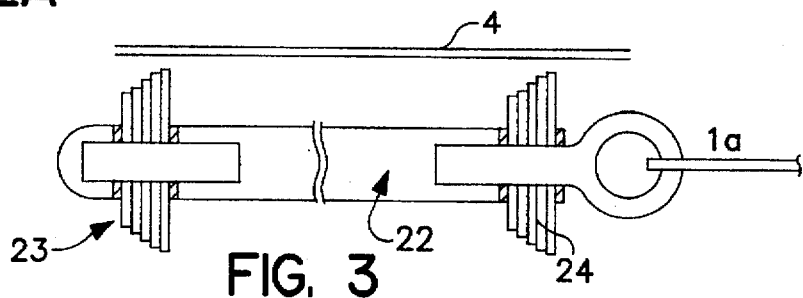
FIG. 3 is a side view of a piston unit which exerts a pulling force on the cable in addition to the pressure or tensile force provided solely by the presence of water and the flow of water in the tubing.

FIG. 3 is a side view of the piston device, from which it will be seen that said device is comprised of a central body 22 having a front part which presents a plurality of packing seals 23, and a rear part which also presents a plurality of packing seals 24.

It will be seen from FIG. 3 that the largest cross-sectional size of the packing seals 24 is only somewhat larger than the largest cross-sectional size of the packing seals 23. It will also be seen from FIG. 2 that the cross-sectional shape of respective packing seals 23, 24 conforms to the cross-sectional shape of the tubing 4 but that the cross-sectional size of said packing seals is smaller than the cross-sectional size or area of the tubing 4.

The cross-sectional size of the central body 22 of the piston unit is much smaller than the inner cross-sectional size of the tubing 4, for instance by 50%, and is provided with front and rear elastic seals (23, 24) which widen rearwardly as seen in the feed direction.

Each of the elastic devices is comprised of from two to ten lamellae, preferably three to seven lamellae, in the illustrated case 5 lamellae.

The largest lamella has a cross-sectional size which is from 1 to 10% smaller than the inner cross-sectional size of the tubing 4, so as to permit a small volume of liquid to pass from the liquid-filled tubing 4 beyond the seal.

The aforesaid central body 22 is comprised of an active probe which functions to transmit radio signals or the like so as to enable the position of the front end of the cable to be readily traced, particularly when insertion of the cable is stopped.

Finally, FIG. 4 also illustrates an alternative embodiment of the transition between a first channel section 13 and a second channel section 14, by means of which washing of the cable surfaces can be improved.

It will be understood that the invention is not restricted to the described and illustrated exemplifying embodiment thereof and that modifications can be made within the scope of the invention as defined in the following claims.

For instance, the volume of water used and the water pressure applied can be controlled with the aid of known means.

Furthermore, reference is made in the aforegoing to a non-metallic cable. This reference is primarily meant to infer a cable having an optical conductor, and it will be understood that such a cable may be enclosed in a metallic casing which functions as a moisture barrier.

The pressure applied may also be greater than 1–2 bars on some occasions. For instance, pressures of up to 8–10 bars and even higher may be used in some instances.

Although the exemplifying embodiment has been described with reference to lengths of tubing of up to 1–3 km, it has been found that the invention an be applied effectively with tubing lengths of up to 5 km.

Although the packing seal 23, 24 has been described as comprising a plurality of lamellae, it will be understood that a single lamellae 24' or 23' whose shape corresponds to the shape applicable to several lamellae can be used, although with an outer surface that has a truncated conical shape. In the case of this embodiment, edgerelated grooves 25' which extend parallel with a centre axis can be provided for the throughflow of liquid. The shape, size and number of the grooves 25' will be adapted to prevailing circumstances, wherein the ridges 26' defined by adjacent grooves will serve as a support against the inner wall of the tubing.

In the case of tubing provided with a serrated inner surface, the piston will be liable to rotate, and consequently a swivel 27' is preferably mounted between piston 20' and cable so as to enabale the piston to rotate freely without causing the cable to accompany rotation of piston.

We claim:

1. A method of inserting one or more cables into a tubing, comprising the steps of:

causing a cable to pass through a nozzle arrangement attached to a tubing;

securing an end of the cable to a piston and placing the piston in the tubing, the piston having one or more seals, the seals being of a lesser dimension than an inner dimension of the tubing;

causing liquid to flow through the tubing such that the liquid supports a portion of the cable disposed in the tubing and flows past the one or more seals of the piston to cause the piston to move through the tubing and thereby causing a putting force acting upon the cable end and thereby drawing the cable through the tubing, wherein the one or more seals is bendable such that a greater quantity of liquid flows through the tubing and past the one or more seals as an operating pressure of the liquid is increased, and as the liquid flows through the tubing, diverting at least a portion of the liquid into an interior of the nozzle arrangement and across an outer surface of a section of the cable present in the interior of the nozzle arrangement to clean the outer surface of the cable section.

2. The method according to claim 1, wherein the nozzle arrangement includes an inner elastic packing, the inner elastic packing including two consecutive channel sections, a first channel section corresponding to a thickness of the cable, and a second channel section being larger than the thickness of the cable, the portion of the liquid flowing through the nozzle arrangement flowing into the nozzle arrangement through an inlet of the nozzle arrangement into the second channel section and flowing out of the nozzle arrangement through an outlet of the nozzle arrangement such that the outer surface of the cable section is cleaned in the second channel section.

3. A method of inserting one or more cables into a tubing, comprising the steps of:

causing a cable to pass through a nozzle arrangement attached to a tubing, securing an end of the cable to a piston and placing the piston in the tubing, the piston having one or more seals, the seals being of a lesser dimension than an inner dimension of the tubing;

causing liquid to flow through the tubing such that the liquid supports a portion of the cable disposed in the tubing and flows past the one or more seals of the piston to cause the piston to move through the tubing and thereby causing a pulling force acting upon the cable end and thereby drawing the cable through the tubing, wherein the one or more seals is bendable such that a greater quantity of liquid flows through the tubing and past the one or more seals as an operating pressure of the liquid is increased, and wherein the cable is caused to pass through the nozzle arrangement by a cable feeder, and at least a portion of the cable disposed in the tubing is subjected to a tensile force by the liquid flowing in the tubing.

* * * * *